United States Patent [19]

Aoki

[11] 4,327,304
[45] Apr. 27, 1982

[54] WINDING FOR SMALL ROTARY ELECTRIC DOUBLE AIR GAP MOTOR

[75] Inventor: Kanemasa Aoki, Yokohama, Japan

[73] Assignees: Canon Kabushiki Kaisha; Canon Seiki Kabushiki Kaisha, both of Tokyo, Japan

[21] Appl. No.: 94,787

[22] Filed: Nov. 16, 1979

[30] Foreign Application Priority Data

Nov. 25, 1978 [JP] Japan .................. 53/145518

[51] Int. Cl.³ .............................................. H02K 1/22
[52] U.S. Cl. ..................................... 310/266; 310/198; 310/203; 310/40 MM
[58] Field of Search ............... 310/266, 261, 195, 198, 310/40 MM, 203–208

[56] References Cited

U.S. PATENT DOCUMENTS

| | | | |
|---|---|---|---|
| 3,871,070 | 3/1975 | Kazansky | 310/266 X |
| 4,123,679 | 10/1978 | Miyasaka | 310/266 |
| 4,219,753 | 8/1980 | Heyraud | 310/266 X |

FOREIGN PATENT DOCUMENTS 2126199  12/1971  Fed. Rep. of Germany ...... 310/266

*Primary Examiner*—Mark O. Budd
*Attorney, Agent, or Firm*—Fitzpatrick, Cella, Harper & Scinto

[57] ABSTRACT

A coreless rotary electric appliance comprising a rotary coil of a cup-shaped coil body open at an end face thereof which is composed of inclined coil wire portions wound with a determined angle along the cylindrical periphery of said coil body and of end connecting wire portions arranged on one end face of said coil body to connect said coil wire portions in succession whereby said coil body being formed by a continuous wire composed of said coil wire portions connected in succession by said end connecting portions, whereby said coil body being featured by an asymmetrical structure that two coil wire portions connected to both ends of each end connecting wire portion and wound along the cylindrical periphery of said coil body are provided with different inclination angles with respect to the generatrix of said cylindrical surface of the coil body.

9 Claims, 25 Drawing Figures

WINDING FOR SMALL ROTARY ELECTRIC DOUBLE AIR GAP MOTOR

BACKGROUND OF THE INVENTION

1. Field of the Invention

The present invention relates to a coreless rotary electric appliance, and more particularly to a coil winding method for forming a cup-shaped coil body open at an end face thereof with a continuous wire comprising inclined coil wire portions wound along the cylindrical periphery of said coil body and connected in succession by end connecting wire portions arranged on an end face of said coil body, and to a rotary electric appliance utilizing such coil winding method.

2. Description of the Prior Arts

There are already proposed various methods for forming a cup-shaped rotary coil, and the present applicant disclosed, in the Japanese Patent Publication Sho No. 49-22361, a winding method for a double-layered cup-shaped coil in which inclined coil wire portions arranged with a determined inclination angle along the cylindrical periphery of the coil body are connected in succession by end connecting wire portions arranged only on one end face of said coil body.

In a so-called magnet DC motor utilizing a permanent magnet as the field magnet, the suitable selection of the DC resistance R, effective conductor number Z and effective magnetic flux $\phi$ of the armature is indispensable for designing a motor of a desired performance. Among the iron loss, copper loss and mechanical loss which constitute three major losses in the DC motor, the iron loss can be rendered practically negligible by the use of a coreless rotor, since the hysteresis loss resulting from alternation of the magnetic flux does not exist in this case and the eddy current loss on the stator side is also negligibly small. Also such coreless structure significantly reduced the reactance voltage induced in the coil by the commutation due to the absence of iron core, thus realizing almost ideal commutation and achieving a stabler function and a longer service life of the commutating mechanism.

Such motor well satisfies the following theoretical equation for a motor circuit without iron loss:

$$IaV - Ia^2R = IaEc \quad (1)$$

wherein
V:input terminal voltage
Ia:armature current
Ec:inverse electromotive voltage
R:Ra+Rb
Ra:armature resistance
Rb:brush contact resistance.

Thus, the output IaEc can be increased by minimizing the copper loss $Ia^2R$ with respect to a given value of input IaV by suitable designing, and it is rendered easily possible to obtain a highly efficient motor if the mechanical loss included in said output IaEc is satisfactorily controlled. In certain applications, however, the method of appropriately determining the above-mentioned parameters R, Z and $\phi$ becomes important in order to achieve desirable revolution and other characteristics of the motor. In the known methods of forming a cylindrical cup-shaped coil without end connecting wire portions on both end faces thereof as shown in FIG. 2, such as disclosed in the U.S. Pat. No. 3,360,668, DAS No. 1,188,709 or Japanese Patent Publication Sho No. 38-2151, the winding width So' which determines the effective number of conductors as shown in FIG. 3 becomes severely limited if it is desired to obtain a flatter coil with a smaller inclination angle $\theta$ of the effective coil portions as shown in FIG. 1.

In FIG. 3 the winding width So per segment is given by the peripheral length of the rotor divided by the number of commutator segments, and the number of conductors in said winding width So corresponds to the number of coil turns in a core slot in case of an iron core rotor. Furthermore, for a given value of So, the effective winding width So' is given by the equation $So' = So \cdot \sin \theta$ and thus depends upon the inclination angle $\theta$ of the coil. Naturally the angle $\theta$ should be constant over the entire coil, and, if not, the effective winding width So' is limited by the minimum value of $\theta$. The coil therefore assumes a helical trajectory with a constant inclination along the cylindrical surface of the armature. In order to wind a given effective number of conductors within said effective winding width So' it becomes necessary to employ a wire of smaller diameter for a flatter coil even if the diameter dm of the armature remains constant, thus resulting in an increased copper loss and thus a lowered efficiency, due to the increased armature resistance Ra in the foregoing motor equation.

The coil structure disclosed by the present applicant in the Japanese Patent Publication Sho No. 49-22361 is provided with end connecting wire portions on one end face of the coil body as shown in FIG. 4, whereby the inclination angle $\theta$ of the coil wire portions on the cylindrical periphery can be arbitrarily determined and need not be decreased in proportion to the flattening of the coil body. In this manner it is rendered possible, by suitably determining the angle $\theta$ as a function of the armature resistance Ra, effective conductor number Z and effective total flux $\phi$, to prevent severe limitation on the effective winding width So' in a conventional flat coil and thus to avoid the increase in the armature resistance Ra.

As an example, the coil resistance Ra for a coil with an average diameter dm of 29.4 mm, a coil height lc of 18 mm, five commutator segments and 240 effective conductors is 2.23Ω for the coil structure shown in FIG. 1 and 0.66Ω for the coil structure shown in FIG. 4.

In the above-mentioned calculation it is supposed that the fold-back points A and C of the wire portions are in the diametrically opposed positions, and that the connecting portion $\overline{AC}$ is wound along the upper brim of the cup-shaped coil body. However it is also possible to connect the points A and C with a linear or quasi-linear end connecting portion constituting a chord on the upper end face of said coil body, in order to further reduce the resistance Ra without affecting the effective value of Z·$\theta$ as shown in FIG. 5. In such structure the distance $\overline{ABCA}$ which is equal to 10.4 cm in the structure of FIG. 4 is reduced to 0.2 cm, whereby the resistance Ra is reduced from 0.66Ω to 0.59Ω corresponding approximately a quarter of the resistance in the conventional structure.

In this manner the invention disclosed in the Japanese Patent Publication Sho No. 49-22361 was principally aimed at the improvement in R and Z among three major motor parameters, but the present inventors found that the coil area intersecting the magnetic flux can be controlled by suitably selecting the end connecting positions, as detailedly disclosed in DOS No.

2,126,199. According to this invention the above-mentioned fold-back points A and C need not be in diametrically opposite positions but can be suitably positioned according to the extent of flattening of the coil.

In the foregoing example on which the resistance has been calculated, the end connecting points are in diametrically opposite positions. However a maximum coil area can be obtained by displacing the position $\chi$ in FIG. 8 to the negative side on the axis X-X' while the coil winding rate can be increased despite of the reduced coil area if the position X is displaced to the positive side. In the following there is described the determination of the maximum coil area. It is known that, when a closed circuit formed of an arbitrary closed curve is placed in a uniform parallel magnetic field, the moment developed in said circuit along any arbitrary axis is proportional to the area of the projection of said closed circuit onto a plane parallel to said axis and to the direction of magnetic field. FIG. 6 shows the relationship between the projected coil area and the end connecting positions in case of the coils as shown in FIGS. 5 and 8, wherein the center angle $\alpha$ or $2\pi - \alpha$ corresponding to the end connecting points A, C is defined as the end connection angle.

In the following calculation, the tangent of the inclination angle of the helical curve L is defined as k. $\gamma$ shown in FIG. 6 represents the position of coil in cylindrical coordinate.

$$Z = r\gamma k \qquad (1)$$

$$y = r \cdot \sin \gamma = R \cdot \sin z/rk \qquad (2)$$

The equation (2) indicates that the projection of the curve L is a sinusoidal curve. By numerical calculation the torque T(t) generated in a one-turn elementary coil can be represented by the following equation:

$$T(t)_{max} = 1.45 \, rlBI \qquad (3)$$

wherein $\alpha = 92.92° \sim 92.94° \approx 93°$, B=magnetic flux density of gap, and I=current conducting through coil. In the coil shown in FIG. 7 which corresponds to a case of t=1 in FIG. 6:

$$T(1) = 1.27 \, rlBI \qquad (4)$$

Also in case of $t = \frac{1}{2}$ corresponding to the end connections at diametrically opposite positions:

$$T(\tfrac{1}{2}) = 1.27 \, rlBI \qquad (5)$$

In this manner these two coils provide a same area, but the latter is advantageous in the winding rate because of the larger angle $\theta$.

In summary, in a cup-shaped armature coil open at an end thereof the end connecting portions on an end face provides the freedom of freely selecting the parameters R, Z and $\phi$ without affecting the structural performance as the cup-shaped rotor.

SUMMARY OF THE INVENTION

The object of the present invention is to provide an improvement over the coreless rotary electric appliance disclosed in the Japanese Patent Publication Sho No. 49-22361.

Another object of the present invention is to provide the aforementioned coil featured in the freedoms of parameters further uniform torque.

Still another object of the present invention is to increase the effective area of the coil thereby increasing the generated torque.

BRIEF DESCRIPTION OF THE DRAWINGS

FIGS. 16 to 19 show another embodiment of the present invention wherein;

FIG. 16 is a schematic view showing the partial coil winding method for the coil of the present embodiment;

FIG. 17 is a schematic view showing the connecting lead extraction from the end connecting portions between adjacent partial coils to a commutator segment in the present embodiment;

FIG. 18 is a perspective view showing an example of forming a coreless rotary coil; and FIG. 19 is plan view and developed view of the coil shown in FIG. 18.

DESCRIPTION OF THE PREFERRED EMBODIMENTS

Figure 9:
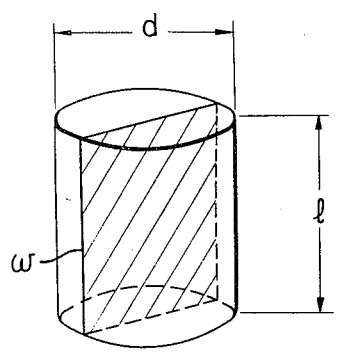
FIGS. 9 and 10 are schematic views for explaining the function of a rotary coil placed in a magnetic field.
Figure 10:
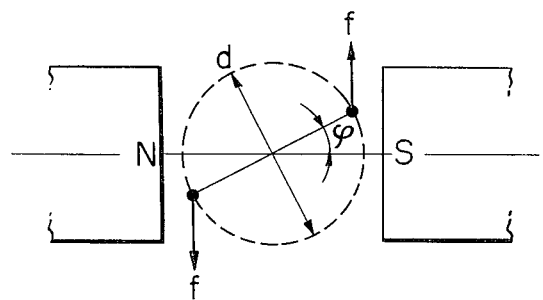

FIGS. 9 and 10 are schematic views for explaining the function of a rotary coil placed in a magnetic field. FIG. 9 shows an elementary coil W of the maximum area to be obtained on a coil cylinder of a diameter d and a length l. When such coil W is placed in a uniform parallel magnetic field as shown in FIG. 10, the force f induced in said coil W can be represented by the following equation:

$$f = Bil \quad (6)$$

wherein B is the intensity of the magnetic field (in gauss), i the current in the coil (in ampere) and l the coil length.

In FIG. 10, the torque $\tau$ when the coil W forms an angle $\phi$ with the line indicating direction of the magnetic field is:

$$\tau = fd \cdot \cos\phi = Bild \cdot \cos\phi = Bia \cdot \cos\phi \quad (7)$$

wherein A = ld, i.e. the area of the coil. The equation (7) indicates that the torque $\tau$ is at maximum when $\phi = 0$ and becomes larger as the area A increases. Although the foregoing explanation refers to a rectangular coil, the equation (7) is applicable to any coil of an arbitrary form. In more general terms, as already explained, the torque is proportional to the area of the projection of the coil onto a plane including the coil axis and parallel to the direction of the magnetic field.

Figure 11:
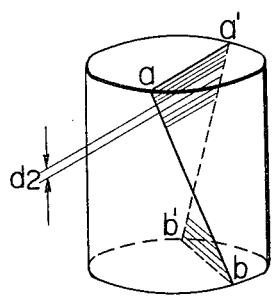
FIG. 11 is a chematic view in which the rectangular coil shown in FIG. 9 is twisted.

In FIG. 11 there is shown a coil obtained by twisting the rectangular coil shown in FIG. 9, whereby the coil plane is not flat but skewed.

In such case the skewed plane of the area A can be divided into a small length $d_z$ along the axial direction of the motor shaft. The uppermost small divided coil portion develops the maximum torque when the side $a-a_1$ becomes parallel to the direction of the magnetic field, and in this manner the equation (7) is still applicable to each small divided portion of the coil. The maximum torque developed by an elementary coil is therefore distributed along the direction rotation, whereby the developed torque is rendered uniform along the direction of rotation.

The coil winding method for forming the twisted cylindrical coil shown in FIG. 11 is however not applicable for the preparation of the cup-shaped coreless rotary coil because of the presence of the end connecting portions on both end faces. According to the present invention there is provided a winding method for forming a cup-shaped coil in which the elementary coil plane is twisted.

Figure 12A:
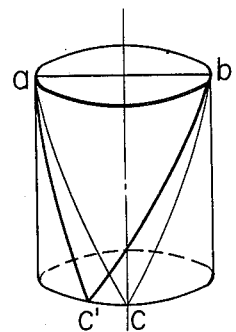
FIG. 12A is a schematic view showing an elementary coil with a-b-c winding scheme disclosed in the Japanese Patent Publication Sho No. 49-22361 as prior art and a twisted coil with a-b-c' winding scheme according to the present invention
Figure 12B:
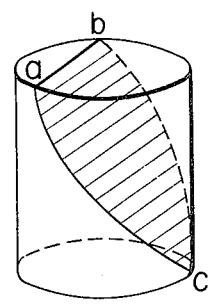
FIG. 12B is a schematic view showing an elementary coil according to the prior art coil winding scheme.

FIG. 12A shows, in a schematic view, the elementary coil of rotary coil obtained by the winding method dis-closed in the Japanese Patent Publication Sho No. 49-22361 of the present applicant, wherein the coil plane is flat and inclined with respect to the axis of rotation. As shown in FIGS. 12A and 12B, the inclined coil wire portions $\overline{ac}$ and $\overline{bc}$ starting from the ends of an end connecting wire portion $\overline{ab}$ and wound on the cylindrical surface arrive at a point c at the open end of the coil body with a same inclination angle and in a symmetrical manner with respect to the generatrix of said cylindrical surface (cf. FIG. 12B). If said point c is displaced to another point c' as shown in FIGS. 12A and 12C, the coil portions $\overline{ac'}$ and $\overline{bc'}$ become no longer symmetrical with respect to the generatrix of the cylinder, and the elementary coil plane ac'ba composed thereof with the end connecting portion ab is not flat but becomes skewed.

More detailedly, in the coil formed by the winding method shown in FIG. 12A, the elementary coil is provided with a coil plane composed of an end connecting portion $\overline{ab}$ extending from a point a on the circular periphery of an end face of the cylindrical coil body to another point b on said periphery along said end face, a first inclined coil wire portion $\overline{bc}$ extending from said second point b to a point c' on the brim at the other end face, and wound along the cylindrical surface, and a second inclined coil wire portion $\overline{c'a}$ extending from said point c' to the aforementioned first point a. In this manner the above-mentioned twisting can be obtained by forming said first inclined coil wire portion from said end connecting point a to a point c on the other end of the coil body, folding back the wire at said point c' and forming the second inclined wire portion from said point c' to another end connecting point b wherein said first and second inclined coil wire portions $\overline{ac'}$ and $\overline{c'b}$ being rendered asymmetrical.

Figure 12C:
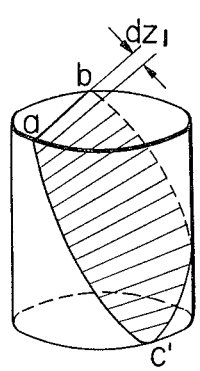
FIG. 12C is a schematic view showing an elementary coil according to the coil winding scheme of the present invention.

If the coil plane shown in FIG. 12C is divided into small portions dz1, dz2, ..., dzn along the axis of rotation as shown in FIG. 11, the torque generated by each small divided portion is largest at the uppermost coil portion dz1 when the small coil surface conforms with the direction of the magnetic flux.

Consequently the maximum torque generated in the elementary coil is distributed along the direction of rotation whereby the torque is rendered more uniform.

Figure 13:
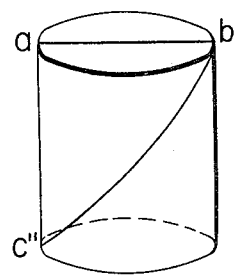
FIG. 13 is a schematic view showing an elementary coil embodying the coil winding method of the present invention.

FIG. 13 shows, in a schematic view, an example of the winding method of the present invention, wherein the point c' in FIG. 12A is further displaced to another point c" whereby the coil portion $\overline{ac''}$ becomes parallel to the generatrix of the cylinder while the coil portion $\overline{bc''}$ is composed by a helical trajectory. The coil plane $\overline{abc''}$ has a larger twisting or skew compared with that shown in FIG. 12A, and therefore provides a larger effect of torque homogenization. Thus in the coil obtained by the winding method shown in FIG. 13, the elementary coil is composed of an end connecting portion $\overline{ab}$ extending from a first point a on the circular periphery of an end face of the cylindrical coil body to a second point b on said periphery, a parallel coil portion $\overline{ac''}$ parallel to the axis of rotation of said coil body, and an inclined coil portion $\overline{c''b}$.

Figure 14:
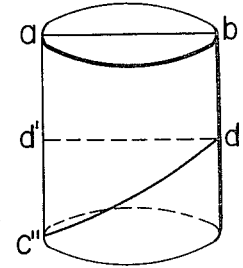
FIG. 14 is a schematic view of an elementary coil of another embodiment of the present invention.

FIG. 14 shows, in a schematic view, another embodiment of the present invention for increasing the projected coil area of the coil shown in FIG. 13. In the winding method shown in FIG. 14, a coil wire portion $\overline{ac''}$ is provided parallel to the generatrix of the cylinder as in the method shown in FIG. 13 and the end connecting portion $\overline{ab}$ remains same as in the structure shown in FIG. 13, while the other coil portion $\overline{bc''}$ wound along the cylindrical surface is bent at an intermediate point d in such a manner that the coil portion $\overline{bd}$ is rendered parallel or almost parallel to the generatrix of the cylinder and the coil portion $\overline{c''d}$ is composed of a helical curve. The above-mentioned structure provides a larger coil area abdc" to generate an increased torque, and the coil plane c"d'd is skewed to provide more uniform torque.

More detailedly, in the coil formed by the winding method shown in FIG. 14, the elementary coil is composed of an end connecting portion $\overline{ab}$ extending from a first point a on the circular periphery of an end face of the cylindrical coil body to a second point b on said periphery through said end face, first and second parallel coil wire portions $\overline{ac''}$ and $\overline{bd}$, and an inclined coil wire portion $\overline{dc''}$ connecting the end points d, c" of said first and second parallel coil wire portions.

The coil of the present invention shown in FIGS. 12A and 12C, 13 or 14 can be wound in the following manner. In case of the coil structure shown in FIG. 12, pins are provided at the points a, b and c' on a cylindrical frame, and a coil is wound in the order of $\overline{ab}$, $\overline{bc'}$ and $\overline{c'a}$ around said pins and fixed thermally or with an adhesive to said cylindrical frame. The adjacent coil is wound in a similar manner after said pins are displaced along the periphery of said cylindrical frame, and this procedure is repeated until the winding is completed around said frame.

As explained in the foregoing, the winding method of the coreless coil according to the present invention is characterized in that a pair of coil wire portions wound on the cylindrical surface of the coil body is rendered asymmetrical with respect to the generatrix of said cylindrical surface to obtained a skewed coil plane and that one of said paired coil portions being bent at a point to increase the coil area, in order to obtain a uniform and increased torque. For this reason the winding method of the present invention is most suitable and effective for forming a cup-shaped coil particularly as a rotor coil for a coreless rotary electric appliance, and also a stator coil for a brushless motor.

Figure 15A:
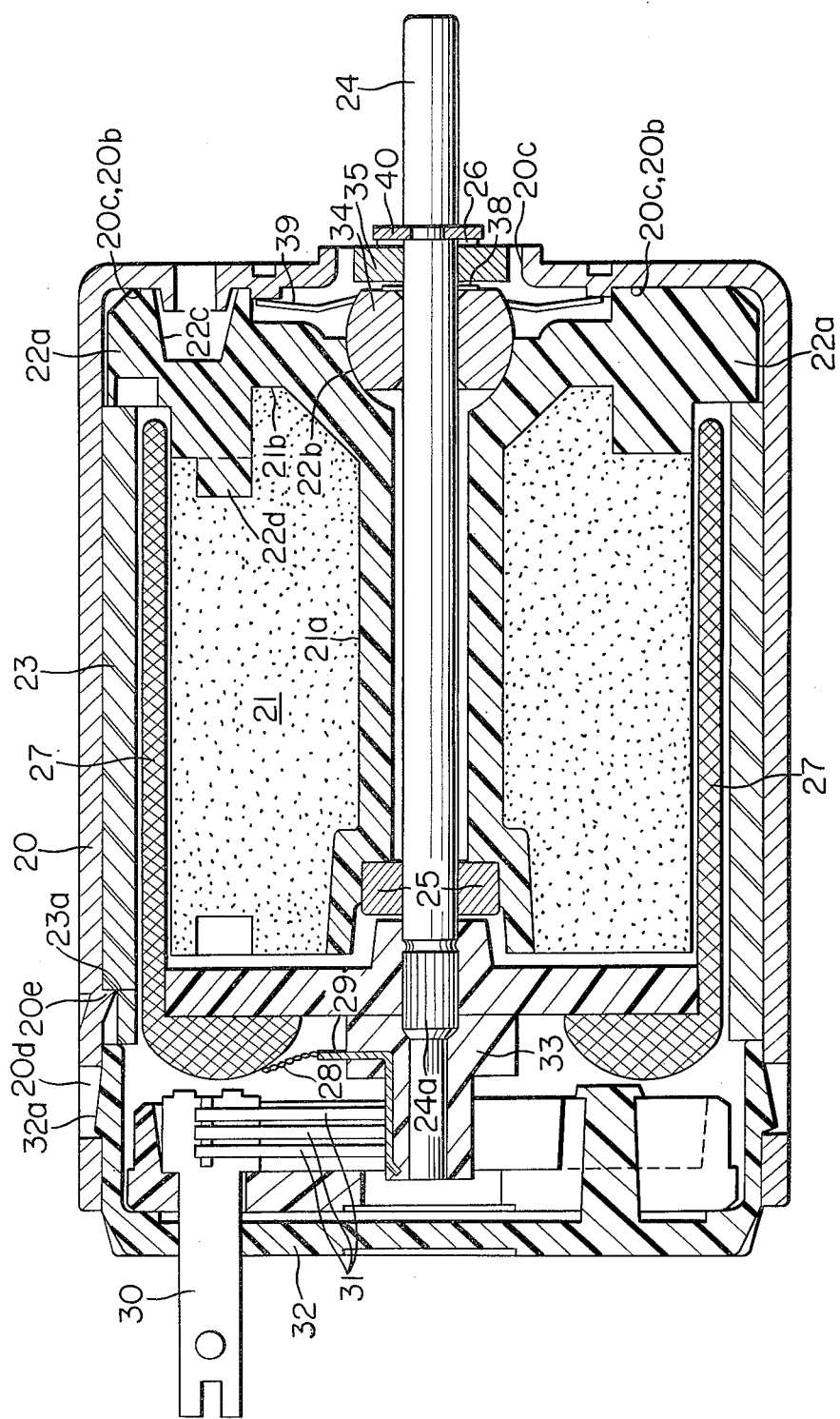
FIG. 15A is an axial cross-sectional view of a rotary electric appliance employing a coil of the present invention.

FIG. 15A shows, in an axial cross-sectional view, a coreless motor employing the coil of the present invention and principally composed of a stator functioning as the motor casing, a rotor, motor cover means etc.

Figure 15B:
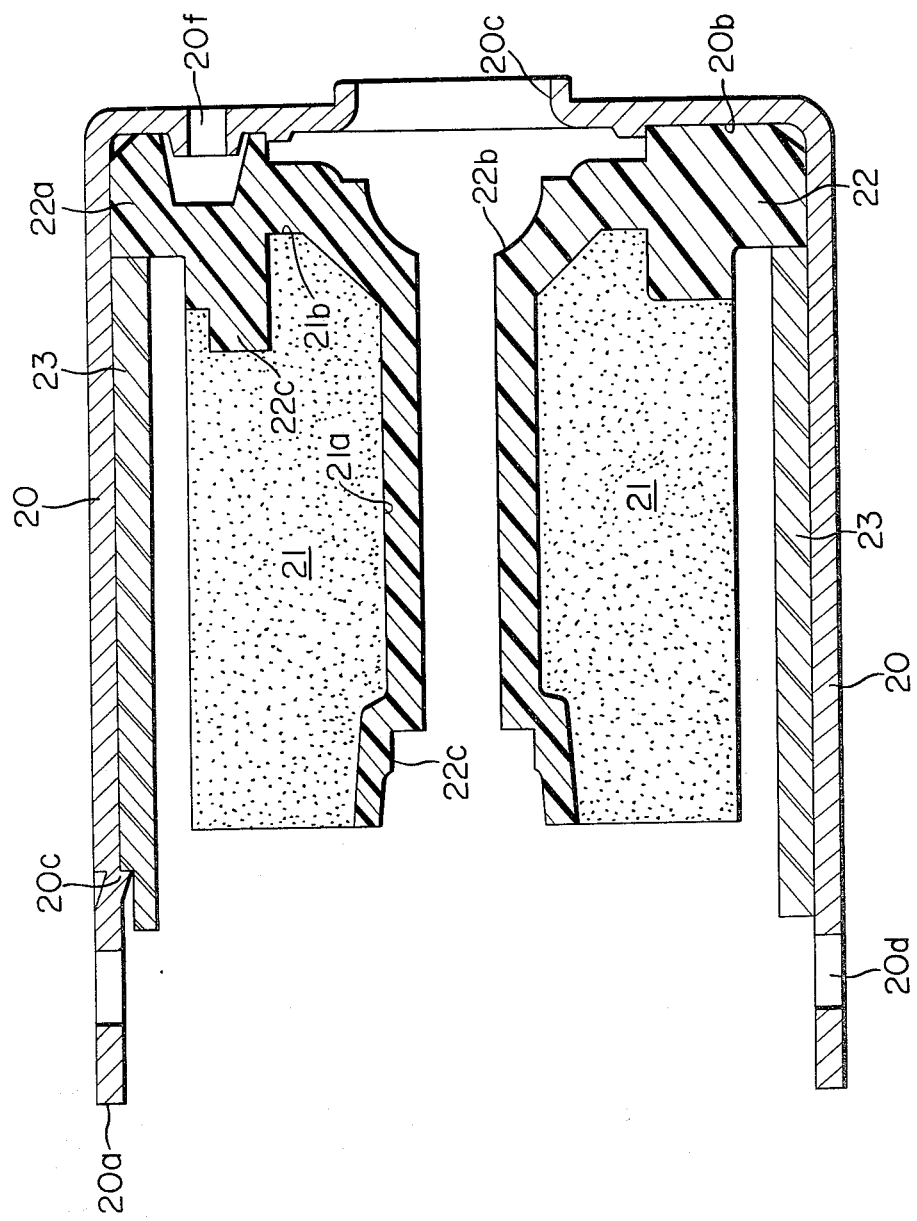
FIG. 15B is an axial cross-sectional view of the stator of the appliance shown in FIG. 15A.

FIG. 15B shows, in an axial cross-sectional view, the stator of said coreless motor, wherein 20 is a tubular motor casing made of a soft-magnetic material, said casing being open at an end 20a and being provided at the other end 20b with an opening 20c for the motor shaft 24. 20d are engaging holes or grooves provided around the outer periphery on the open end side of the casing 20 for engaging with the motor cover to be explained later. 20f is a hole for mounting the motor, 21 is a fixed tubular permanent magnet serving as the field magnet, and 22 is a fixing member of a plastic material integrally formed with said permanent magnet 21 so as to cover the internal peripheral surface 21a and 21b thereof, said member 22 being provided with a flange portion 22a at an end thereof to be inserted toward the end wall 20c of the motor casing 20 and with a spherical bearing seat 22b for receiving a bearing 34 of automatic centering type. In addition said fixing member 22 is provided at the other end thereof with a seat 22c for receiving another bearing 25. Said fixing member 22 is fixed to the motor casing 20 by means of a fixing member 23 to be explained later while the lateral wall 20b thereof is maintained in pressure contact with the lateral surface 22b of said member 22.

23 is a fixed yoke 23 made of a soft-magnetic material and auxiliary to the stator and is inserted inside the casing 20 to form a magnetic circuit therewith, wherein an end 23a thereof is maintained in abutting relationship with said fixing member 22 while the other end 23b is maintained in position by a projecting portion 20c protruding from the motor casing 20 to a direction perpendicular to the shaft.

Figure 15C:
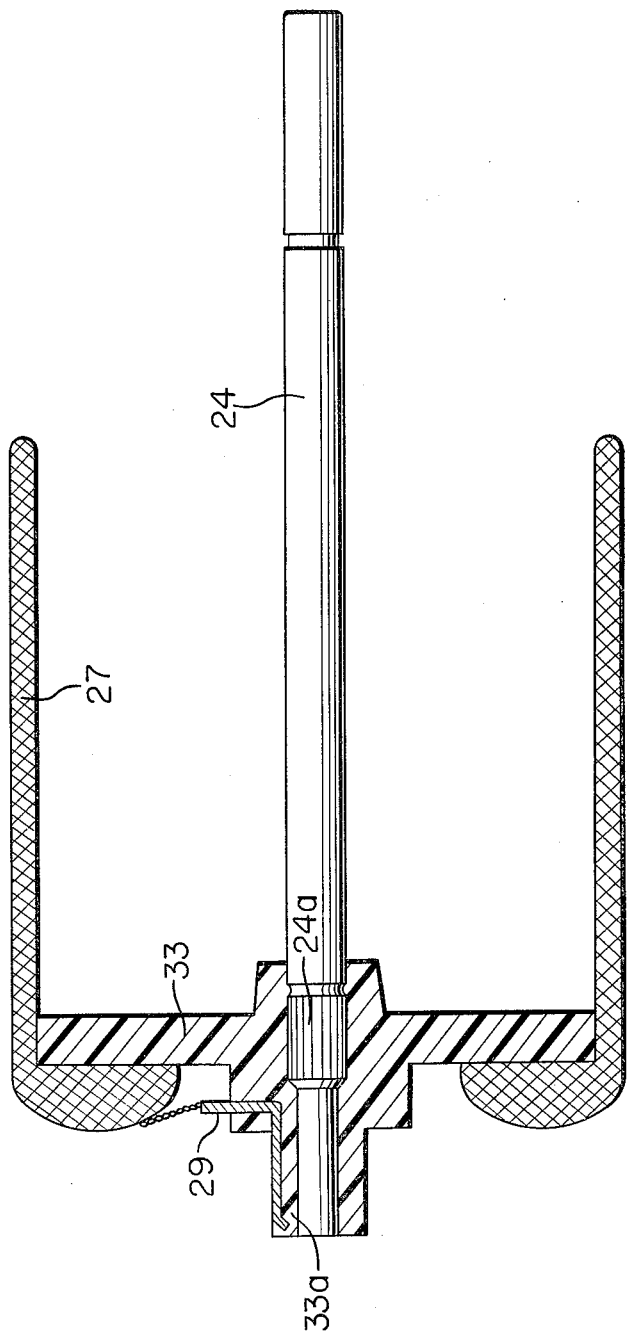
FIG. 15C is an axial cross-sectional view of the rotor of the appliance shown in FIG. 15A.

FIG. 15C shows, in a cross-sectional view, the rotor of said coreless motor, wherein 24 is a motor shaft which is rotatably supported in said stator by means of bearings 25 and 34.

A part of said shaft 24 is formed as a grooved roulette 24a on which a coil fixing member 33 of plastic material is formed by insert molding. A coil 27 wound in a cup shape is fixed in a part of the internal periphery thereof on said coil fixing member 33.

29 is a commutator which is fixed by molding in a portion 33a of said fixing member 33 formed on said shaft 24 and is rendered contactable at one end thereof with the contact brushes and connected at the other end thereof with the leads of the coil 27.

Now there will be given an explanation on the method of assembly of the coreless motor shown in FIGS. 15A, 15B and 15C. The stator assembled as shown in FIG. 15B is mounted with an unrepresented bearing metal (35 in FIG. 15A), and the rotor shown in FIG. 15C is inserted therein.

In this manner the shaft is journalled at the center of the permanent magnet 21 by means of the bearings 25 and 34, and the coil 27 is inserted into the gap between the permanent magnet 21 and the auxiliary yoke 23. A spacer ring 38 for adjusting the position of the bearing 34 with respect to the motor casing 20 and a stop ring 35 are pressed in from the right-hand end of the shaft 24 and maintained in position by a washer 40. Said stop ring 35 is provided for preventing the flow of the adhesive material to the bearing in case a pulley for example is fixed on the shaft by said adhesive.

39 is a spring member for biasing the bearing 34 against the spherical bearing seat 22b of the fixing member 22.

After the rotor comprising the shaft 24, coil 27, commutator 29 etc. is inserted into the stator, a cover 32 shown in FIG. 15B is mounted to close the open end of the motor casing 20 and to fix said cover 32 onto the casing 20. Said cover 32 is composed of a plastic or a metal material and is provided on the inside thereof with power supply terminals 30 which are partially exposed externally at an end thereof for power supply connection and are connected at the other end thereof to brushes 31 maintained in contact with said commutator 29.

The cover 32 holding the power supply terminals 30 and brushes 31 closes the open end of the motor casing 20 and is fixed by the engagement of the protruding portions 32a with grooves or openings 20c of said casing 20.

The motor of the above-explained structure is advantageous in that, since the magnetic returning circuit is composed of the casing 20 and the auxiliary yoke 23, an eventual change in the thickness of the coil 27 can be accommodated by a change in the thickness of said yoke 23 without the change in the structure of the entire motor.

The above-mentioned structural advantage is particularly important in case the material of the permanent magnet 21 is to be changed.

The skewed coil structure explained in connection with FIGS. 12, 13 and 14 can be employed in the rotor coil of the motor shown in FIGS. 15A, 15B and 15C for obtaining a uniform motor torque, but it is to be understood that such coil structure is naturally applicable.

FIGS. 16 to 19 show another embodiment of the present invention applied to a cup-shaped coil body having coil wire portions inclined at a determined angle along the periphery of said coil body and end connecting wire portions on one end face thereof for connecting said coil wire portions in succession, wherein said inclined coil wire portions and end connecting wire portions constituting an assembly of partial coils composed of a plurality of conductors each wound in plural turns in a same place.

Figure 16:
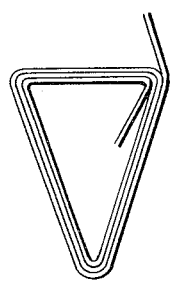
Figure 17:
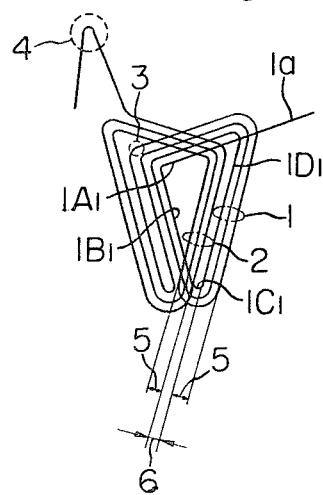

FIG. 16 schematically shows the method of coil winding in this embodiment, while FIG. 17 schematically shows the connection between adjacent partial coils and the extraction of leads therefrom to be connected to the commutator, wherein 1 and 2 respectively represent a first conductor group and a second conductor group, and 3 indicates the transition point therebetween.

In the first conductor group a one-turn coil is composed, from the starting end 1a, of an end connecting portion 1A₁, an inclined coil portion 1B₁ (forward side), a coil returning portion 1C₁ and a coil portion 1D₁ (backward side), and the first conductor group is composed of three one-turn coils.

Figure 18:
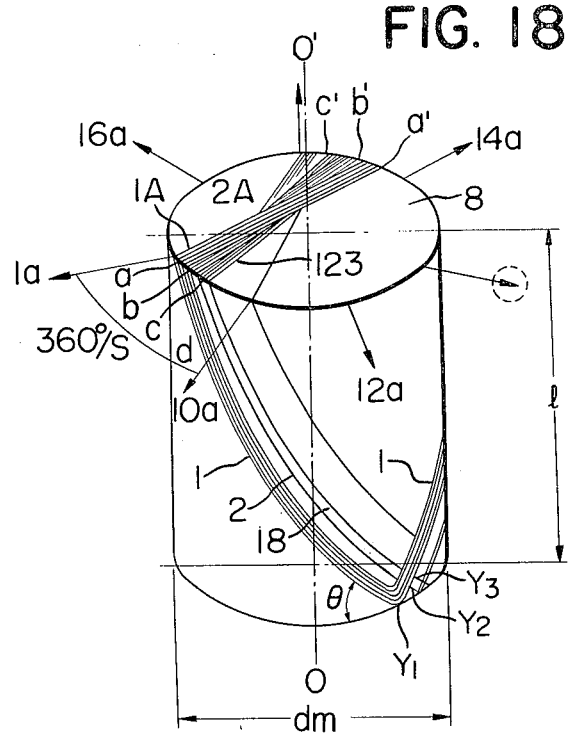

FIG. 18 shows, in a perspective view, an example of the coil winding method of the coreless rotary coil of the present embodiment, wherein 0–0' is the rotating axis, dm the average diameter of the coil body, l the axial length of the coil body and $\theta$ the helical angle. As shown in FIG. 18 the coil is wound from a point a on the cylindrical surface spirally thereon with a helical angle $\theta$ to reach a returning point Y, from which it is again wound spirally backward along the cylindrical surface to reach a point a' on the starting end face 8, from which it is guided along a chord a–a' on said end face 8 to reach a point b adjacent to the starting poing a. The coil is wound along said trajectory a-Y-a'-a a desired number of times to form the first conductor group shown in FIG. 17.

Figure 1:
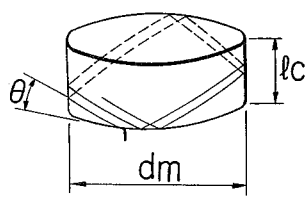
FIGS. 1 and 2 are schematic views of conventional flat coils.
Figure 2:
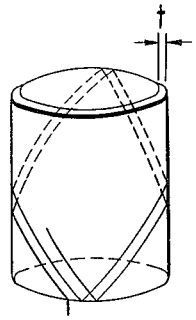
Figure 4:
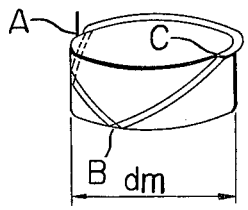
FIGS. 4 and 5 are schematic views showing the coil winding method disclosed in the Japanese Patent Publication Sho No. 49-22361.
Figure 3:
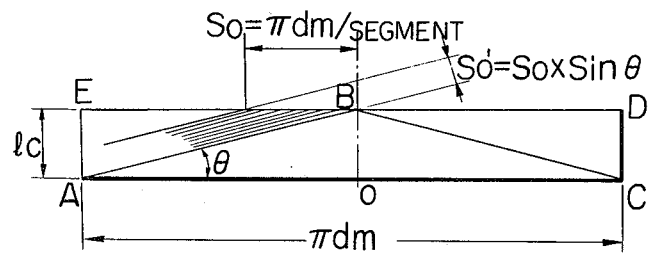
FIG. 3 is a developed view of the coil shown in FIG. 1.
Figure 5:
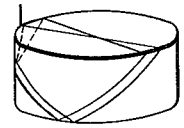
Figure 6:
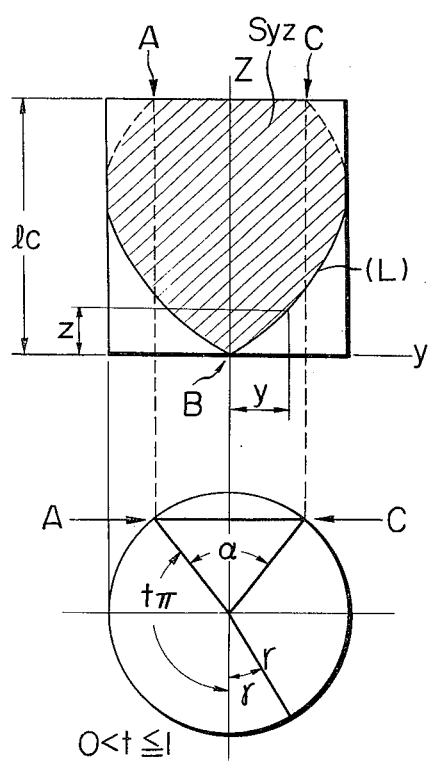
FIG. 6 is a view showing the relationship between the projected area of the coil shown in FIG. 5 and the end connecting positions.
Figure 7:
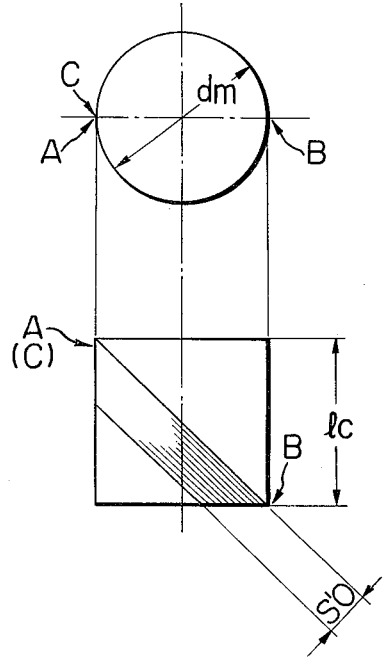
FIGS. 7 and 8 are schematic views of the coil wires obtained by the coil winding method shown in FIG. 5.
Figure 8:
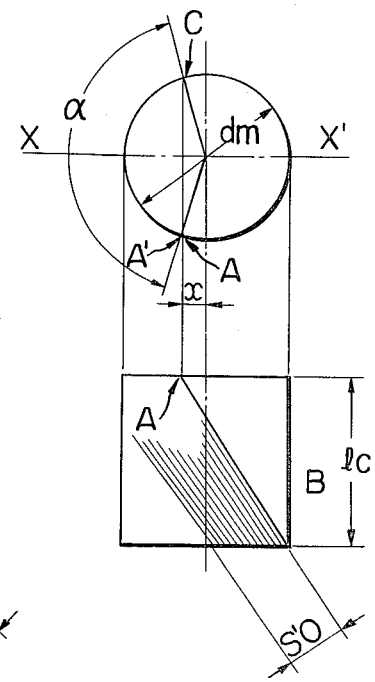

After the completion of said first conductor group, a second conductor group 2 is formed by displacing the direction of the end connecting portions by a determined angle on the end face 8. In FIG. 18, 1A and 2A respectively indicate the end connection portions of the first and second conductor groups. while 10a, 12a, 14a and 16a are leads for connection with the commutator segments. The conductors in the coil 1 or 2, or in the end connecting portion 1A, 2A . . . are arranged mutually parallel.

Figure 19A:
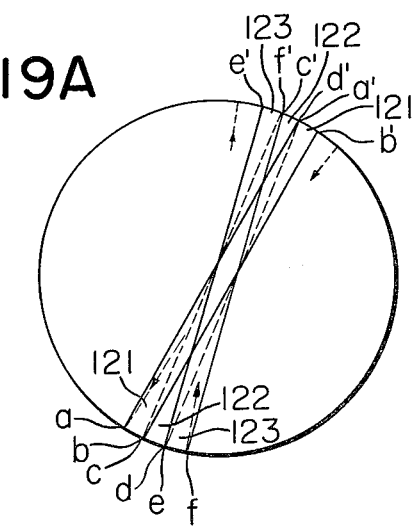
Figure 19B:
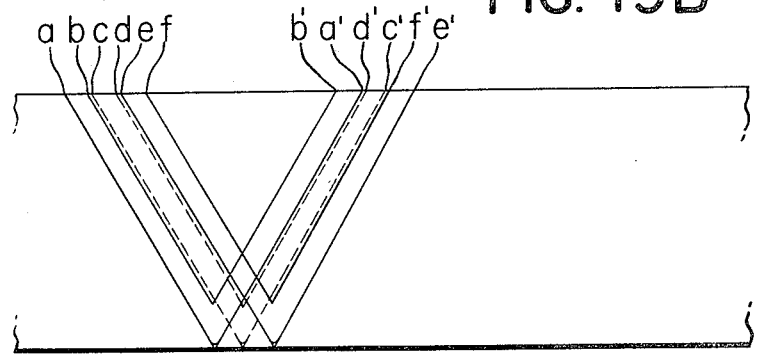

FIG. 19A and 19B show the coil body of FIG. 18 in a plan view and a developed view, respectively.

Figure 15D:
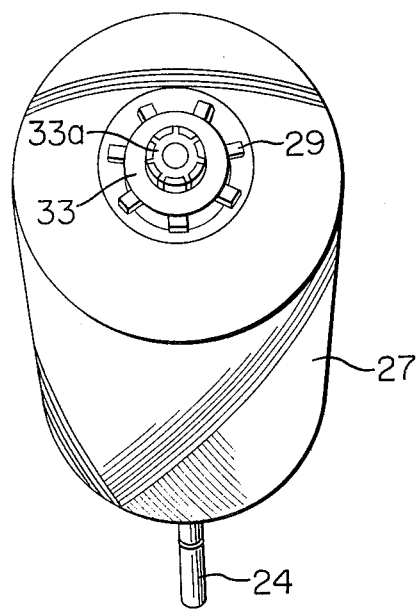
FIG. 15D is a perspective view of the rotor.

FIG. 15D is a perspective view of the coil for the motor shown in FIGS. 15A to 15C embodying the present invention, wherein said coil being shown in the state of rotor having the shaft 24, commutator 29, etc.

The coil body shown in FIGS. 16 to 19 is composed of coils with unskewed coil plane. The incorporation of skewed structure in said coil plane as explained in connection with FIGS. 12A, 12B and 12C allows to obtain a uniform torque as explained in the foregoing and thus a stabilized rotation.

The advantage obtained by the coil body shown in FIGS. 16 to 19 is explained in the following. In a coil of close winding obtained with the method disclosed in the Japanese Patent Publication Sho No. 49-22361 and with 50 turns per segment with a wire of 0.3 mm in diameter, the width of winding space will be $0.3 \times 50 = 15$ mm. In case it is desired to obtain a 150-turn coil for a motor of lower revolution, the wire diameter becomes $15/150 = 0.1$ mm. so that the coil thickness 0.6 mm ($0.3 \times 2$) for the 0.3 mm wire is reduced to 0.2 mm ($0.1 \times 2$). The coil resistance, which is inversely proportional to the square of wire diameter and proportional to the wire length, becomes 27 times ($3^2 \times 3$) larger. On the other hand the torque constant K which is proportional to the square of Z becomes 9 times ($3^2$) larger, so that the value of m, which is proportional to K/R, is reduced to one third (9/27). This is due to a fact that the winding space of 0.6 mm thickness is only utilized up to 0.2 mm ($0.1 \times 2$). However with the use of multi-layered winding as explained in the foregoing, it is rendered possible to employ a wire diameter larger than 0.1 mm which will give a coil thickness of 0.6 mm with 150 turns. For example a 150-turn coil with a wire of 0.173 mm in diameter provides an unvaried value of m since the resistance and the value of K both increase 9 times.

What I claim is:

1. A coil for a coreless motor, comprising:
   (a) end connecting wire portions provided on one end face of a cup-shaped coil body open at the other end thereof, each for connecting a first point on the circular periphery of said end face of said coil body with a second point on said periphery through said end face;
   (b) first inclined coil wire portions each provided from said second point of said end connecting wire portion to a point on the circular periphery on the other end of said coil body along the generatrix of the cylindrical surface of the coil body; and
   (c) second inclined coil wire portions each provided from said point on the other end of coil body to said second point of said end connecting wire portion along the generatrix of the cylindrical surface of the coil body, wherein said first and second inclined coil wire portions have asymmetric inclination angles.

2. A coreless motor equipped with the coil of the claim 1.

3. A coil for a coreless motor, comprising:
   (a) end connecting wire portions provided on one end face of a cup-shaped coil body open at the other end thereof, each for connecting a first point on the circular periphery of said end face of said coil body with a second point on said periphery through said end face;
   (b) parallel coil wire portions each provided from said first point of said end connecting wire portions to the other end of said coil body along the generatrix of the cylindrical surface parallel to the rotational axis thereof; and
   (c) inclined coil wire portions each provided for connecting said the other end of the parallel coil wire portion and the other end of end connecting wire portion.

4. A coreless motor equipped with the coil of the claim 3.

5. A coil for a coreless motor, comprising:
   (a) end connecting wire portions provided on one end face of a cup-shaped coil body open at the other end thereof, each for connecting a first point on the circular periphery of said end face of said coil body with a second point on said periphery through said end face;
   (b) first parallel coil wire portions each provided from said second point on said periphery along the generatrix of the cylindrical surface of said coil body and parallel to the rotational axis thereof;
   (c) second parallel coil wire portions each provided from said first point on said periphery along the generatrix of the cylindrical surface of said coil body and parallel to the rotational axis thereof; and
   (d) inclined coil wire portions each connecting said first parallel coil wire portion with said second parallel coil wire portion.

6. A coreless motor equipped with the coil of the claim 5.

7. A coil according to the claim 1, wherein said end connecting wire portions and said first and second inclined coil wire portions are wound plural turns in the same place.

8. A coil according to the claim 3, wherein said end connecting wire portions, parallel coil wire portions and inclined coil wire portions are wound plural turns in a same place.

9. A coil according to the claim 5, wherein said end connecting wire portions, first and second parallel coil wire portions and inclined coil wire portions are wound plural turns in a same place.

* * * * *